Nov. 21, 1939.  A. C. BORCHERS  2,180,859
VIBRATION RETARDING MEANS FOR ELECTRICALLY ACTUATED APPARATUS
Filed Dec. 8, 1937  2 Sheets-Sheet 1

INVENTOR.
Alvin Carl Borchers
BY Frank M. Slough
ATTORNEY.

Nov. 21, 1939.   A. C. BORCHERS   2,180,859
VIBRATION RETARDING MEANS FOR ELECTRICALLY ACTUATED APPARATUS
Filed Dec. 8, 1937   2 Sheets-Sheet 2

INVENTOR.
*Alvin Carl Borchers*
BY
ATTORNEY.

Patented Nov. 21, 1939

2,180,859

UNITED STATES PATENT OFFICE 2,180,859

VIBRATION RETARDING MEANS FOR ELECTRICALLY ACTUATED APPARATUS

Alwin Carl Borchers, Elyria, Ohio, assignor to The General Industries Company, Elyria, Ohio, a corporation of Ohio Application December 8, 1937, Serial No. 178,774

1 Claim. (Cl. 248—18)

This invention relates to vibration retarding and noise reducing means for electrically actuated apparatus, and more particularly to improved means for mounting the motor of such apparatus and transmitting power therefrom, to minimize vibration and noise.

Electric motors, and particularly synchronous motors, have a tendency to create vibration and noise due to magnetic hum and similar causes and in certain types of apparatus, such as sound reproducing apparatus, this condition is highly objectionable. For example, electrically operable phonographs may have such noise and vibration transmitted to the turntable either through the mounting means for the motor or through the turntable shaft and which in turn interferes with the proper reproduction of sound.

It is well known that relatively low frequencies occurring when a motor employs a low cycle field, as for example a 60 cycle field, may be very successfully damped by the use of springs. Rubber dampens frequencies much higher than this successfully, although it is less successfully employed in dampening low frequencies. However, I have found that a construction employing a combination of rubber and steel, felt and steel, or a similar combination of metallic and non-metallic elements such as leather and steel, will successfully effect damping over a very wide frequency band.

I have devised an improved means for mounting an electric motor and for transmitting power therefrom, particularly adapted to electric phonographs and the like, which will minimize the transition of noise and vibration emanating from the motor to other parts of the apparatus.

It is a primary object of my invention, therefore, to provide means minimizing the transition of noise and vibration in an apparatus actuated by an electric motor.

Another object of my invention is to minimize the transition of vibration and noise emanating from an electric motor, through improved mounting and driving means.

Another object of my invention is to provide improved vibration damping means for an electric motor adapted to be effective over a wide frequency band.

Other objects of my invention and the invention itself will become increasingly apparent from a consideration of the following description of drawings, wherein.

Figure 1:
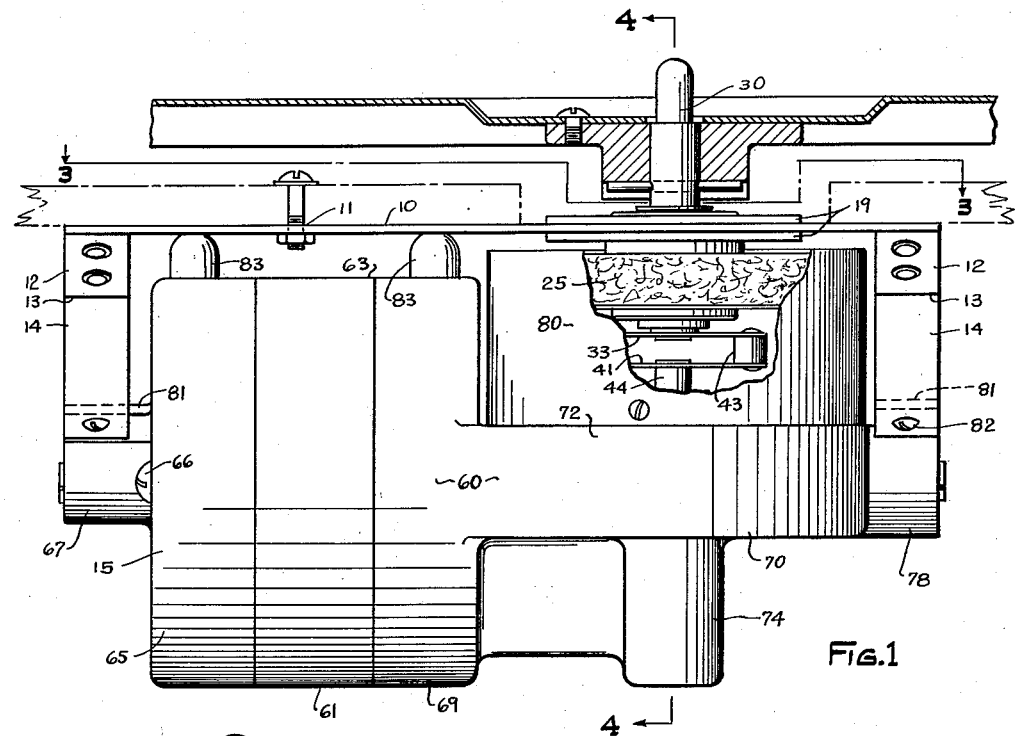
Fig. 1 is a side elevational view showing parts of an electrically operable phonograph embodying my invention.
Figure 2:
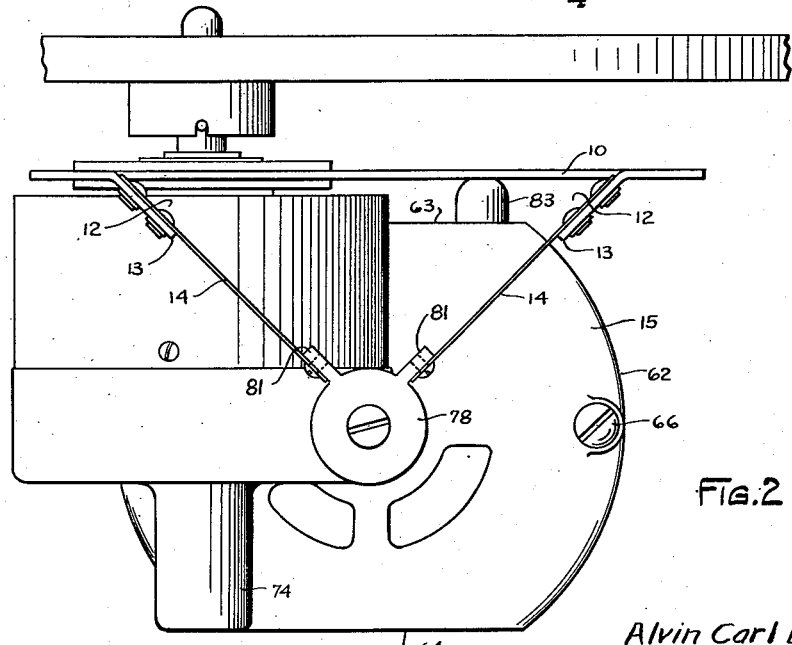
Fig. 2 is a right end elevational view of the parts illustrated in Fig. 1.
Figure 3:
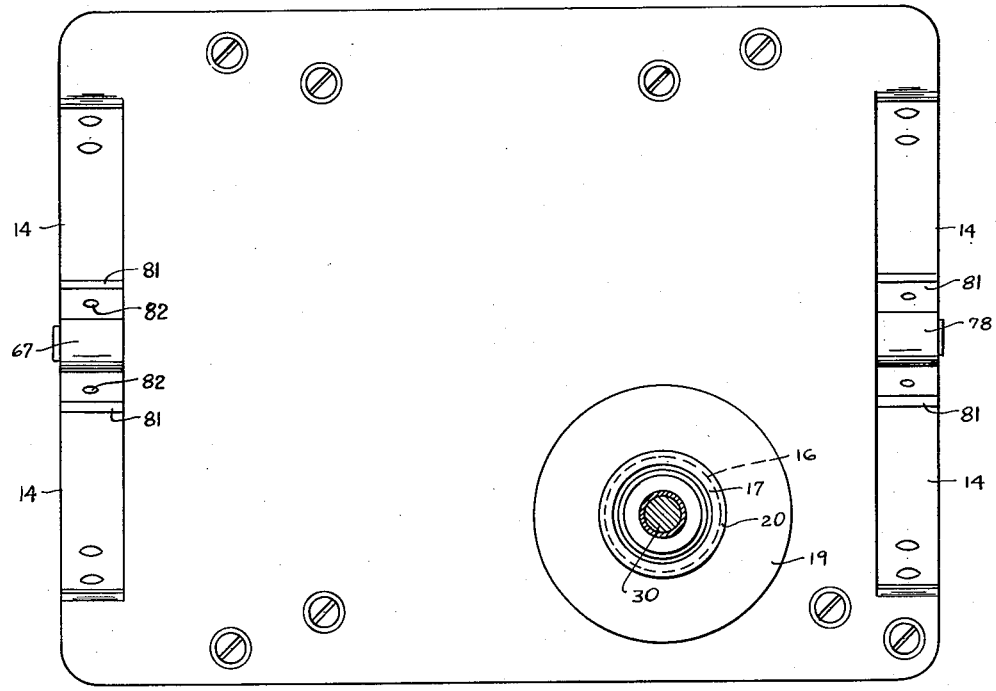
Fig. 3 is a plan sectional view of the parts illustrated in Figs. 1 and 2, taken along the plane 3—3 of Fig. 4.

Referring now to the drawing, I have indicated generally at 10 a mounting plate adapted to be secured to the phonograph cabinet (not shown) in any suitable manner, as by bolts projected through perforations 11 in the plate and engaging portions of the cabinet. The particular method of mounting the plate 10 in the cabinet constitutes no essential part of my invention and any means rigidly supporting the plate may be employed. The plate 10 has opposite end portions recessed, as indicated at 12, and terminal portions of the recess form depending arms 13 converging downwardly and bent at an angle of substantially 45° to the plate. Riveted or otherwise secured to each of the arms 13 is a flat strip 14 formed of suitable spring material whereby the strips 14 may support a motor, generally indicated at 15, in a manner to be later described.

The plate 10 is provided with a relatively large perforation, indicated at 16, through which is projected a bushing 17 having a radially extending external flange 18. Similar perforated metal discs 19 are coaxially aligned with the perforation in the plate 10, and abut the upper and lower surfaces of the plate, the discs 19 being locked in position by the abutting flange 18 of the bushing 17 and spinning over the upper portion of the bushing, as indicated at 20, to form a gripping flange. The upper portion of the bushing 17 is recessed to provide an annular shoulder 21 and a tubular bearing element 22 is telescoped within the bushing, the bearing element being provided with an external radial flange, indicated at 23, abutting the annular shoulder 21 of the bushing to align the bearing element axially. It will be noted that the flange 23 of the bearing element terminates short of the walls of the bushing recess to provide an annular pocket therebetween, upwardly open and for a purpose to be later described.

The bushing 17 and bearing 22 are provided with aligned radially extending perforations, preferably two diametrically opposite perforations, indicated at 24, the perforations being adapted to be filled with lubricant absorbing material, such as felt or the like. Encircling the bushing 17, and abutting the lower face of the flange 18 thereof, is a relatively large felt or the like washer 25 and a supporting fiber or the like washer 26, the washers being maintained in position by spinning over portions of the bushing as indicated at 27, to form a gripping flange.

Figures 4, 5:
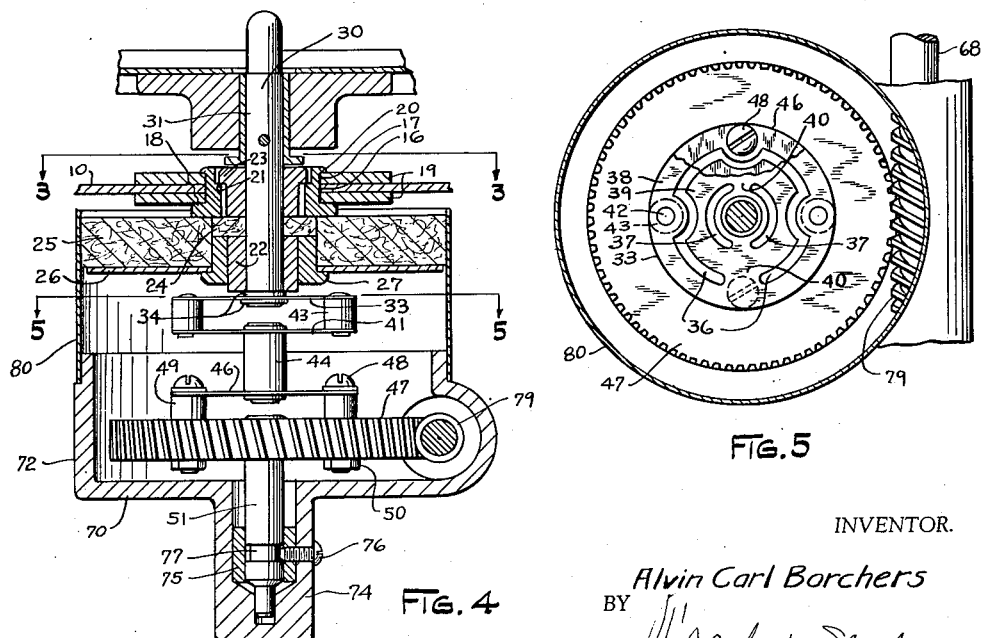
Fig. 4 is a section taken along the line 4—4 of Fig. 1.
Fig. 5 is a sectional view taken along line 5—5 of Fig. 4.

Rotatably supported within the bearings 22 is a turntable shaft, generally indicated at 30, and comprising a shaft portion 31, the lower end of the shaft portion 31 being rigidly secured to a perforated disc element 33 by projecting the shaft through a pair of washers 34 abutting each face of the disc element and also through the disc element and spinning over the shaft end. The disc element 33, as best indicated in Fig. 5, is formed to provide two generally arcuate perforations 36 diametrically opposite and two radially inner perforations 37 disposed on an axis rotated through 90° from the axis of the perforations 36. The disc element 33 is formed of relatively thin spring material and it will be noted that the configuration provides a continuous annular peripheral disc portion 38 joined to a continuous inner disc portion 39 by neck portions 40, thereby permitting the inner portion 39 to have limited movement relative to the outer disc portion 38 about an axis including the neck portions 40. This permits a limited movement of the shaft portion 31. The disc element 33 is joined to a second similar disc element 41 by projecting headed pins 42 through diametrically aligned perforations in the disc elements and through spacing sleeves 43 and spinning over the opposite ends of the pins.

The second disc element 41 is rigidly secured to a second shaft portion 44 through reducing the upper end of the shaft and projecting the reduced portion through a washer and the disc element 41, and spinning over the reduced end of the shaft portion. The opposite end of the shaft portion 44 is secured in a similar manner to a third disc element 46 similar to the disc elements 33 and 41.

The third disc element 46 is secured to a preferably fiber worm gear 47 by projecting bolts 48 through the disc element 46 at diametrically opposite points, through spacing sleeves 49 and through the gear 47, the projecting ends of the bolts 48 being engaged by nuts 50. Thus, driving force imparted to the gear 47 will, in turn, be transmitted to the shaft portion 31 and the turntable through the disc elements which permit a limited universal movement of the shaft portions, and this construction, including the perforated portions of the discs, retards or minimizes noise or vibration from the gear 47. The gear 47, being formed of fiber or similar material, is relatively noiseless in operation and in itself tends to absorb vibration as compared to a metal gear.

A gear shaft 51 is rigidly secured to the gear 47, and is adapted to have bearing in a housing to be hereinafter described, whereby the turntable and gear shafts will have bearing support at two spaced points.

A motor and gear housing, generally indicated at 60, comprising a central member 61 which may consist of a plurality of laminated discs having arcuate external side portions, indicated at 62, and preferably flatted top and bottom portions, indicated at 63 and 64, respectively. An end housing member 65, generally similar in external contour to the member 61, and of cup form, is secured to the member 61 by screws 66. The end member 65 is provided with a tubular portion 67 forming a bearing for one end of a rotor shaft 68, any desired form of bearing construction being employed since the manner of mounting the rotary shaft 68 constitutes no essential part of my invention. The bolts 66 extend through the central member 61 to engage a generally cup-form end portion 69 of a third housing member, generally indicated at 70, the end portion 69 being formed in external contour generally similar to the central member 61.

Extending from the end portion 69 of the housing member 70 is a generally horizontal portion having a circular flange 72 forming a casing for the gear 47, the housing portion 70 also having a vertically extending tubular bearing portion 74 for the gear shaft 51. The particular method of mounting the gear shaft 51 constitutes no essential part of my invention and any desired construction may be employed, such as providing a bronze or the like tubular bearing 75 and maintaining the shaft in position by a set-screw 76 having a conical end engaging a groove 77 provided in the gear shaft 51. An arcuate portion integrally formed with the housing portion 70 is coaxially aligned with the rotor shaft and terminates at its outer end in a bearing 78 for the rotor shaft. The rotor shaft is provided with a worm 79 engageable with the gear 47 whereby the turntable shaft 31 may be rotated from the motor at a reduced speed.

A circular element 80 is telescoped over the flange 72 of the housing member 70, and extends upwardly to terminate adjacent the under side of the plate 10, thereby forming a casing for a portion of the turntable drive shaft mechanism.

The aligned bearings, indicated at 67 and 78, for mounting the rotor shaft 68, are each provided with ears 81 diverging upwardly at an angle of substantially 45° with the vertical axis of the motor housing, the ears being perforated, whereby they may be secured by screws 82 to the flat spring supports 14 to suspend the motor from the mounting plate 10. Housing portions 65 and 69 are each provided with upstanding pins which receive rubber or the like cushioning elements 83, resiliently engaging the underside of the plate 10.

It will now be understood that due to the flat spring elements 14 supporting the motor, together with the cushioning element 83, maintaining the motor resiliently spaced from the under side of the plate 10, and the drive mechanism from the gear 47 to the turntable shaft 31, that vibration and noise which may emanate from the motor is damped prior to reaching the turntable shaft 31 and the mounting plate 10. Thus, magnetic hum and motor vibration is reduced to a minimum through the transition means and is a negligible factor in interfering with a desired reproduction of sound. Although I have illustrated my invention in conjunction with an electrically operable phonograph, it is understood that it will be equally applicable to various types of electrically actuated apparatus wherein undue vibration and noise is objectionable.

Although I have shown and described a preferred form of my invention, I contemplate that numerous and extensive departures may be made therefrom without departing from the spirit of my invention and the scope of the appended claim.

Having thus described my invention, what I claim is:

In combination with the horizontally disposed supporting plate for a phonograph record supporting turntable, a motor for driving said turntable disposed below and entirely supported by said plate in spaced relation thereto, sound insulating cushioning means disposed between and engaging said plate and motor, and a plurality of thin leaf springs pendantly supporting said motor from widely spaced portions of the plate, at least two said springs extending relatively divergingly from the motor frame in directions substantially radial of the motor shaft, said springs holding said plate and motor to maintain said cushioning means therebetween in contact therewith, said springs laterally resiliently yieldable to vibratory movements of the motor to dampen communication of vibration from the motor to said plate and turntable, said cushioning means so engaging said motor as to restrain and subdue rotative movements thereof.

ALWIN CARL BORCHERS.